United States Patent

Kentrat et al.

[11] Patent Number: 5,519,643
[45] Date of Patent: May 21, 1996

[54] METHOD OF OPERATING A MICROPROCESSOR

[75] Inventors: Thomas Kentrat, Sasbachwalden; Helmut Walter, Sinzheim; Klaus Voehringer, Malsch; Holger Pruessel, Buehlertal, all of Germany

[73] Assignee: Robert Bosch GMBH, Stuttgart, Germany

[21] Appl. No.: 178,328

[22] PCT Filed: Jun. 17, 1992

[86] PCT No.: PCT/DE92/00495

§ 371 Date: Jan. 12, 1994

§ 102(e) Date: Jan. 12, 1994

[87] PCT Pub. No.: WO93/02408

PCT Pub. Date: Feb. 4, 1993

[30] Foreign Application Priority Data

Jul. 18, 1991 [DE] Germany .......... 41 23 811.7

[51] Int. Cl.⁶ .................. G04F 5/00
[52] U.S. Cl. .................. 364/569; 364/490
[58] Field of Search .............. 371/62, 12, 16.3; 364/490, 569

[56] References Cited

U.S. PATENT DOCUMENTS

| 4,618,953 | 10/1986 | Daniels et al. | 371/12 |
| 4,734,871 | 3/1988 | Tsunoda et al. | |
| 4,809,280 | 2/1989 | Shonaka | 371/62 |
| 4,964,123 | 10/1990 | Umemoto | 371/16.3 |

FOREIGN PATENT DOCUMENTS

91/02303 2/1991 WIPO.

OTHER PUBLICATIONS

David J. Comer—Digital Logic and State Machine Design 1984 CBS College Publishing, p. 184.

Primary Examiner—Emanuel T. Voeltz
Assistant Examiner—Thomas Pesso
Attorney, Agent, or Firm—Spencer & Frank

[57] ABSTRACT

A method for operating a microprocessor (10) which can be switched by an activation signal (23) at an interrupt input (15) from an inactive operating state to an active operating state, with the activation signal (23) being supplied to the interrupt input (15) after a predeterminable time after each entrance into the inactive state.

3 Claims, 1 Drawing Sheet

METHOD OF OPERATING A MICROPROCESSOR

BACKGROUND OF THE INVENTION

The invention is based on a method of operating a microprocessor that can be switched by a signal at one input from an inactive to an active operating state. WO 91/02303 discloses a wake-up circuit arrangement for a microprocessor which switches a microprocessor that has been switched with the aid of external signals into an inactive operating state back into an active operating state. For each input signal, a separate input circuit is required. The input circuits decouple the individual inputs from one another and ensure defined loads at each one of the inputs.

It is the object of the invention to provide a particularly easily implemented method of operating a microprocessor which can be switched from an inactive to an active operating state by a signal at one input.

SUMMARY AND ADVANTAGES OF THE INVENTION

The above object generally is achieved according to the present invention by a method of operating a microprocessor that can be switched by a signal at one input from an inactive to an active operating state, wherein after entering the inactive state, the activation signal is fed to the input after a predeterminable time.

The method according to the invention has the advantage of a particularly simple implementation and requires only a few components. The measure that, upon each transfer into the inactive state, the activation signal is given to the input after a predetermined time ensures that the microprocessor reacts properly to input signals which occur only occasionally and are processed correspondingly rarely. The transition into the inactive state, which occurs, for example, under the control of a program, reduces the residual current consumption of the microprocessor which is of particular significance for battery supplied systems.

The predeterminable time during which the microprocessor is in the inactive state must be matched to the input signals to be expected.

Advantageous features and improvements of the method according to the invention are disclosed and defined in the dependent claims.

The method according to the invention can be implemented particularly easily with a timer that receives a starting signal from the microprocessor when the latter goes into the inactive state and which, at the end of the predetermined time, sends the activation signal to the microprocessor.

According to another feature of the method according to the invention it is provided that a capacitor is charged with current by way of a terminal of the microprocessor during the active state and is discharged during the inactive state, with the activation signal being picked up at the capacitor. In these methods it must merely be ensured that the terminals of the microprocessor through which the capacitor charging and discharging current flows retain their function in the inactive state. An advantageous modification of this method provides that the capacitor is charged by way of a terminal of the microprocessor and is discharged by way of a further terminal of the microprocessor. The particular advantage of this modification is that the capacitor can be charged quickly during the active state of the microprocessor and discharged comparatively slowly during the inactive state. This measure is significant particularly if the active state is comparatively short compared to the inactive state. The predeterminable time for the inactive state may then be set to be relatively long compared to the time for the active state.

This configuration is particularly easily implemented if ohmic resistors are provided between each one of the microprocessor terminals and the capacitor, with the value of the resistance influencing the charging current being lower than the value of the resistance influencing the discharging current.

Further advantageous modifications and improvements of the method according to the invention will become evident from the further dependent claims in conjunction with the following description.

DETAILED DESCRIPTION OF THE PREFERRED EMBODIMENTS

Figure 1:
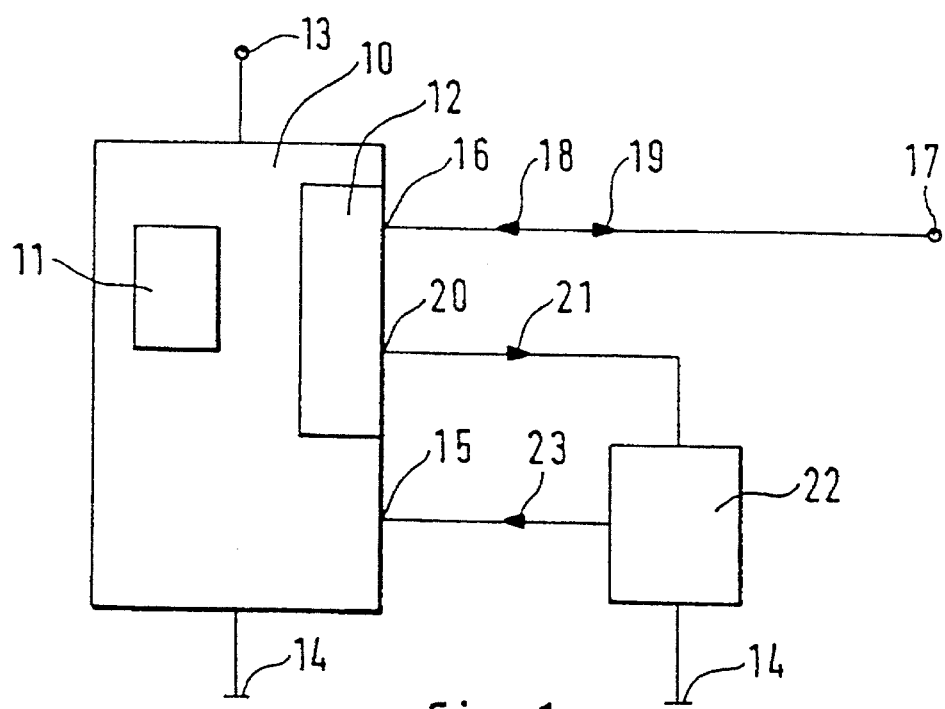

FIG. 1 depicts a microprocessor 10 which includes a program memory 11 and an input/output unit 12. Microprocessor 10 is further provided with terminals 13, 14 for a current supply and a terminal 15 for an interrupt input.

The input/output unit 12 includes a terminal 16 which is connected with an external terminal 17. The external terminal 17 carries input signals 18 as well as output signals 19 coming from microprocessor 10.

By way of a further terminal 20, input/output unit 12 feeds an output signal 21 to a timer 22 which in turn puts out an output signal 23 for interrupt terminal 15. Timer 22 is connected at least to one of the current supply terminals 13, 14.

Figure 2:
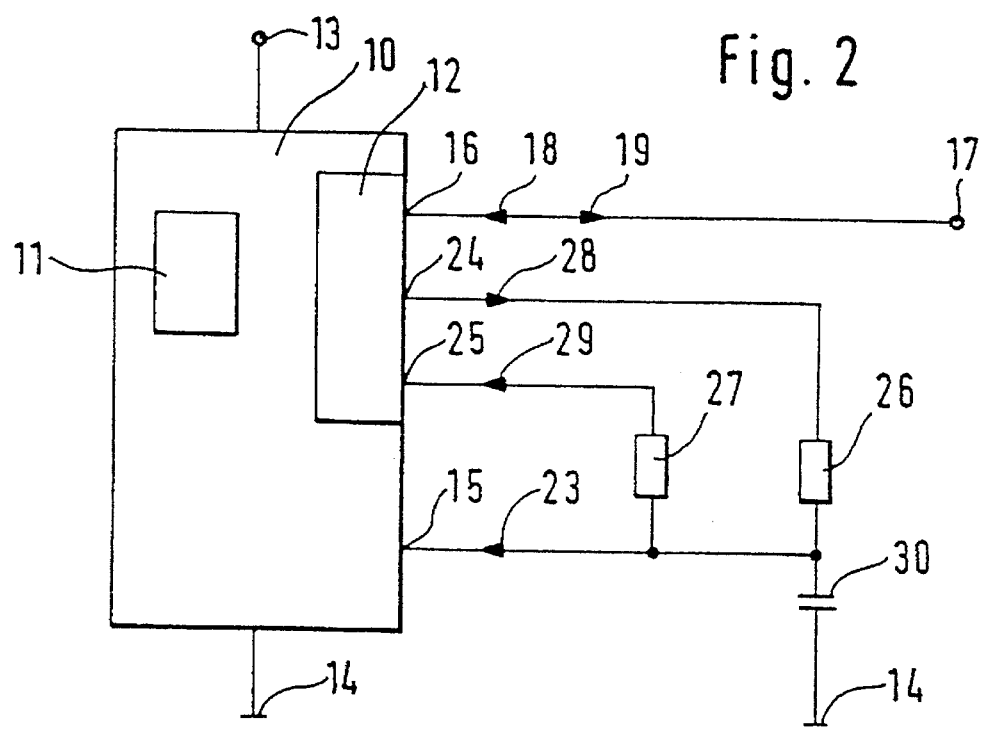
FIGS. 1 and 2 are block circuit diagrams, each including a microprocessor with which the method according to the invention is employed.

The arrangement shown in FIG. 2 includes components which coincide with those shown in FIG. 1. They therefore bear the same reference numerals in FIG. 2 as in FIG. 1.

Input/output unit 12 includes two terminals 24, 25, with respectively connected ohmic resistors 26, 27. An output signal 28 is put out by way of terminal 24 and an input signal 29 is fed to terminal 25. Resistors 26, 27 are connected to a capacitor 30 which is connected with a current supply terminal 14. Interrupt terminal 15 is connected to capacitor 30.

The method according to the invention will be described in further detail with reference to the block circuit diagrams shown in FIGS. 1 and 2.

The microprocessor 10 shown in FIG. 1 is a program controlled, signal processing arrangement which has integrated in it, for example, the program memory 11. The input/output unit 12 includes terminals 16, 20 which can be switched as inputs or outputs depending on the program. The terminal 16 connected with the external terminal 17 may, for example, pick up input signals and also put out output signals 19. In dependence on the use of microprocessor 10, it may happen that microprocessor 10 need not be constantly kept in its active operating state. Some types of microprocessors 10, for example an MC 68 HC 04 P3 manufactured by Motorola Inc., are able to take on a residual energy saving, inactive operating state. The transition into the inactive state is controllable, for example, by a program contained in program memory 11. In some types it is also possible to initiate the inactive operating state by an input signal over a separate input. The residual energy saving inactive state of microprocessor 10 is of particular significance for battery operated systems. Such a use exists, for example, in motor vehicles which, at least if the internal-combustion engine is shut off, are supplied with electrical energy from a battery. In the off state of the internal-combustion engine, a possibly provided alarm system or, for example, a central locking system, both including a microprocessor 10, continue to require electrical energy. However, in these cases operation of microprocessor 10 is necessary only if, for example, an input signal 18 is received by way of external terminal 17 at the terminal 16 of input/output unit 12, with such signal being put out, for example, by a signal generator of the central locking system. After a certain program that is stored in program memory 11 has been run, with the active time lying, for example, in the microsecond range, microprocessor 10 can be switched to the inactive state because the subsequent operating pause lies, for example, in the millisecond or second range or above. In the prior art, microprocessor 10 is therefore connected with partial systems by way of connecting lines so as to switch microprocessor 10 to the active operating state. If there are a plurality of input signals, it is necessary, for example, to have an OR linkage and possibly a respective decoupling of individual lines. This comparatively great effort which incurs costs, can be avoided with the method according to the invention. According to the invention it is provided that with each entrance in to the inactive state on the part of microprocessor 10, the interrupt terminal 15, after a predetermined time, receives an activation signal. In this connection, it is assumed that microprocessor 10 can be switched into the active operating state by way of interrupt input 15.

According to a first embodiment, a timer 22 is provided to put out the activation signal as its output signal 23. After running a program stored in program memory 11, microprocessor 10 puts out an output signal 21 by way of terminal 20 to timer 22. Then it changes to the inactive state. The output signal 21 is a start signal for timer 22 which, at the end of the predetermined time, puts out the activation signal 23. The predeterminable time must be adapted to the minimum reaction time of the system including microprocessor 10. If an input signal 18 appears at external terminal 17 at irregular intervals for a certain minimum duration, the time of timer 22 must be set at less than the minimum signal duration so that the signal is reliably detected.

At the end of the predeterminable time, microprocessor 10 switches into the active operating state. If no signal is detected at external terminal 17, to which a reaction should take place, microprocessor 10 immediately emits another starting signal 21 for timer 22. A monostable flip-flop stage that is available as a finished component, for example under the trade name CD 4047 is suitable as timer 22.

According to another feature of the method according to the invention, which will be described with reference to the block circuit diagram shown in FIG. 2, the timer 22 shown in FIG. 1 is initially replaced by resistor 26 and capacitor 30. During the active state of microprocessor 10, the input/output unit 12 of microprocessor 10 puts out as its output signal 28, by way of terminal 24, a charging current across resistor 26 to capacitor 30. Capacitor 30 is charged to a potential which is equal, for example, to the potential present at the current supply terminal 13 of microprocessor 10. The charging duration is determined by the value of resistor 26, the current and the capacitance of capacitor 30. If microprocessor 10 enters into the inactive state, output 24 is switched as input, with capacitor 30 being discharged by way of the same resistor 26. The discharging time is again determined by resistor 26, the current and the capacitance of capacitor 30. With this configuration, a minimum ratio of 1:1 for the active to the inactive state of microprocessor 10 can be realized.

According to an advantageous modification of this method, a resistor 27 is provided which is connected to terminal 25. During the active state of microprocessor 10, capacitor 30 is charged by way of terminal 24 which is connected as output. If the microprocessor changes to the inactive state, terminal 25 is switched as input and capacitor 30 is discharged by way of resistor 27. The use of a discharging resistor 27 that is separated from the charging resistor 26 has the particular advantage that the charging and discharging times can be given independently of one another. It is thus possible to charge capacitor 30 after a comparatively short duration of the active state and to comparatively slowly discharge it during the inactive state. The charging and discharging currents are determined primarily by resistors 26, 27 in conjunction with the operating voltage.

We claim:

1. A method of operating a microprocessor comprising an interrupt terminal, and an input/output unit having an input terminal and a separate output terminal, the microprocessor being programmable to switch from an active operating state to an inactive operating state, said method comprising the steps of:

(A) providing a timer having a charging resistor connected to the output terminal, a discharging resistor connected to the input terminal, and a capacitor connected to the charging resistor and the discharging resistor;

(B) emitting a charging current through the output terminal and through the charging resistor for charging the capacitor during the active operating state of the microprocessor;

(C) discharging a discharge current from the capacitor through the discharging resistor and through the input terminal, beginning immediately upon the microprocessor entering the inactive operating state;

(D) generating an activation signal in dependence on a discharged state of the capacitor; and (E) receiving the activation signal at the interrupt terminal for switching the microprocessor from the inactive operating state to the active operating state.

2. The method as defined in claim 1, wherein the capacitor is discharged during step (C) in a period of time that is greater than a time required for charging the capacitor during step (B).

3. The method as defined in claim 1, wherein the charging and discharging resistors are respective ohmic resistors each located between the respective terminals of the microprocessor and the capacitor, with a value of a charging resistance of the charging resistor being less than a value of a discharging resistance of the discharging resistor.

* * * * *